US011292910B2

(12) United States Patent
Woo et al.

(10) Patent No.: US 11,292,910 B2
(45) Date of Patent: Apr. 5, 2022

(54) THERMOPLASTIC MICA-FILLED POLYCARBONATE RESIN COMPOSITION AND ARTICLE PRODUCED THEREFROM

(71) Applicant: LOTTE CHEMICAL CORPORATION, Seoul (KR)

(72) Inventors: Eun Taek Woo, Uiwang-si (KR); Sun Young Kim, Uiwang-si (KR); Ho Geun Park, Uiwang-si (KR); Seung Shik Shin, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 0 days.

(21) Appl. No.: 16/767,151

(22) PCT Filed: Dec. 28, 2018

(86) PCT No.: PCT/KR2018/016864
§ 371 (c)(1),
(2) Date: May 27, 2020

(87) PCT Pub. No.: WO2019/132591
PCT Pub. Date: Jul. 4, 2019

(65) Prior Publication Data
US 2020/0385571 A1    Dec. 10, 2020

(30) Foreign Application Priority Data

Dec. 29, 2017 (KR) .......... 10-2017-0184894
Nov. 2, 2018 (KR) .......... 10-2018-0133258

(51) Int. Cl.
| | |
|---|---|
| C08L 69/00 | (2006.01) |
| C08L 23/08 | (2006.01) |
| C08K 3/34 | (2006.01) |
| C08K 9/06 | (2006.01) |
| C08K 5/523 | (2006.01) |

(52) U.S. Cl.
CPC .............. *C08L 69/00* (2013.01); *C08K 3/34* (2013.01); *C08K 9/06* (2013.01); *C08L 23/0869* (2013.01); *C08K 2201/005* (2013.01); *C08K 2201/016* (2013.01)

(58) Field of Classification Search
None
See application file for complete search history.

(56) References Cited

U.S. PATENT DOCUMENTS

| | | | |
|---|---|---|---|
| 4,357,271 A | 11/1982 | Rosenquist | |
| 5,637,643 A | 6/1997 | Umeda et al. | |
| 6,174,943 B1 * | 1/2001 | Matsumoto | ............ C08K 5/523 524/107 |
| 2009/0048389 A1 | 2/2009 | Lee et al. | |
| 2009/0209696 A1 | 8/2009 | Lee et al. | |
| 2009/0209697 A1 | 8/2009 | Persigehl et al. | |
| 2015/0183986 A1 | 7/2015 | Kim et al. | |
| 2017/0342262 A1 | 11/2017 | Choi et al. | |

FOREIGN PATENT DOCUMENTS

| | | |
|---|---|---|
| JP | 08-127711 A | 5/1996 |
| JP | 2000313799 | * 11/2000 |
| JP | 2015-059138 A | 3/2015 |
| KR | 10-2007-0120124 A | 12/2007 |
| KR | 10-2008-0029891 A | 4/2008 |
| KR | 10-2009-0018569 A | 2/2009 |
| KR | 10-2015-0078277 A | 7/2015 |
| KR | 10-2016-0081806 A | 7/2016 |
| WO | 2019/132591 A1 | 7/2019 |

OTHER PUBLICATIONS

International Search Report in counterpart International Application No. PCT/KR2018/016864 dated Apr. 10, 2019, pp. 1-4.

* cited by examiner

*Primary Examiner* — David J Buttner
(74) *Attorney, Agent, or Firm* — Additon, Pendleton & Witherspoon, P.A.

(57) ABSTRACT

A thermoplastic resin composition of the present invention comprises: about 100 parts by weight of polycarbonate resin; about 20 to about 60 parts by weight of mica which has been surface-treated with a silane compound; about 0.1 to about 20 parts by weight of a modified polyolefin comprising a repeating unit represented by chemical formula 1 and a repeating unit represented by chemical formula 2; and about 3 to about 20 parts by weight of a phosphorus flame retardant. The thermoplastic resin composition has excellent impact resistance, strength, flame retardancy, fluidity, and the like.

9 Claims, No Drawings

THERMOPLASTIC MICA-FILLED POLYCARBONATE RESIN COMPOSITION AND ARTICLE PRODUCED THEREFROM

CROSS-REFERENCE TO RELATED APPLICATIONS

This application claims priority to and the benefit of International Application No. PCT/KR2018/016864, filed Dec. 28, 2018, which published as WO 2019/132591 on Jul. 4, 2019, Korean Patent Application No. 10-2017-0184894, filed in the Korean Intellectual Property Office on Dec. 29, 2017, and Korean Patent Application No. 10-2018-0133258, filed in the Korean Intellectual Property Office on Nov. 2, 2018, the entire disclosure of each of which is incorporated herein by reference.

TECHNICAL FIELD

The present invention relates to a thermoplastic resin composition and a molded product produced therefrom. More particularly, the present invention relates to a thermoplastic resin composition, which has good properties in terms of impact resistance, stiffness, flame retardancy, flowability, and the like, and a molded product produced therefrom.

BACKGROUND ART

Thermoplastic resin compositions have lower specific gravity than glass or metal, good formability, and good impact resistance, and are useful for housings of electrical/electronic products, automotive interior/exterior materials, and exterior materials for buildings. Particularly, with the trend toward larger and lighter electrical/electronic products, plastic products produced from thermoplastic resins are rapidly replacing typical glass and metal-based products in the related art.

In recent years, with the development of portable electronic products formed of thermoplastic resin compositions and having compact and lightweight structures, the electronic products are required to have both high impact resistance and high stiffness to prevent damage due to external impact. However, there is a tradeoff between stiffness and impact resistance and it is difficult for a typical thermoplastic resin composition to realize high stiffness and high impact resistance at the same time.

Although various inorganic and organic flame retardants are used for a thermoplastic resin composition in order to improve flame retardancy, use of an excess of the flame retardants can cause deterioration in impact resistance of the thermoplastic resin composition.

Therefore, there is a need for development of a thermoplastic resin composition having good properties in terms of impact resistance, stiffness, flame retardancy, flowability, and balance therebetween.

The background technique of the present invention is disclosed in JP Unexamined Patent Publication No. 2015-059138 A and the like.

DISCLOSURE

Technical Problem

It is one aspect of the present invention to provide a thermoplastic resin composition having good properties in terms of impact resistance, stiffness, flame retardancy, flowability, and the like.

It is another aspect of the present invention to provide a molded product formed of the thermoplastic resin composition.

The above and other aspects of the present invention can be achieved by the present invention described below.

Technical Solution

1. One aspect of the present invention relates to a thermoplastic resin composition. The thermoplastic resin composition includes: about 100 parts by weight of a polycarbonate resin; about 20 parts by weight to about 60 parts by weight of mica surface-treated with a silane compound; about 0.1 parts by weight to about 20 parts by weight of a modified polyolefin including a repeat unit represented by Formula 1 and a repeat unit represented by Formula 2; and about 3 parts by weight to about 20 parts by weight of a phosphorus flame retardant:

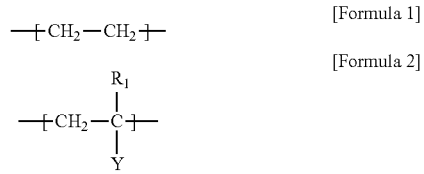

where $R_1$ is a hydrogen atom or a methyl group, Y is —$COOR_2$ ($R_2$ being a $C_1$ to $C_{12}$ alkyl group), a glycidyl modified ester group, an arylate group, or a nitrile group (—CN).

2. In Embodiment 1, the mica may have an average particle diameter of about 60 μm to about 300 μm and an aspect ratio of about 50 to about 150 in a cross-section thereof.

3. In Embodiment 1 or 2, the modified polyolefin may include about 50 wt % to about 95 wt % of the repeat unit represented by Formula 1 and about 5 wt % to about 50 wt % of the repeat unit represented by Formula 2.

4. In Embodiments 1 to 3, the phosphorus flame retardant may include at least one selected from among a phosphate compound, a phosphonate compound, a phosphinate compound, a phosphine oxide compound, and a phosphazene compound.

5. In Embodiments 1 to 4, the mica and the modified polyolefin may be present in a weight ratio of about 3:1 to about 40:1.

6. In Embodiments 1 to 5, the thermoplastic resin composition may have a notched Izod impact strength of about 3 kgf·cm/cm to about 30 kgf·cm/cm, as measured on a ⅛" thick specimen in accordance with ASTM D256-10e1.

7. In Embodiments 1 to 6, the thermoplastic resin composition may have a flexural modulus of about 60,000 kgf/cm² to about 90,000 kgf/cm², as measured on a 6.4 mm thick specimen at a rate of 2.8 mm/min in accordance with ASTM D790.

8. In Embodiments 1 to 7, the thermoplastic resin composition may have a flame retardancy of V-0 or higher, as measured on a 1.5 mm thick specimen by a UL-94 vertical test method.

9. In Embodiments 1 to 8, the thermoplastic resin composition may have a spiral flow length of about 250 mm to about 300 mm, as measured after injection molding in a spiral-shaped 2 mm thick mold under conditions of a molding temperature of 260° C., a mold temperature of 60° C., an injection pressure of 1,500 kgf/cm², and an injection rate of 120 mm/s.

10. Another aspect of the present invention relates to a molded product. The molded product is formed of the thermoplastic resin composition according to any one of Embodiments 1 to 9.

Advantageous Effects

The present invention provides a thermoplastic resin composition having good properties in terms of impact resistance, stiffness, flame retardancy, and flowability, and a molded product produced therefrom.

BEST MODE

Hereinafter, embodiments of the present invention will be described in detail.

A thermoplastic resin composition according to the present invention includes: (A) a polycarbonate resin; (B) mica; (C) a modified polyolefin; and (D) a phosphorus flame retardant.

As used herein to represent a specific numerical range, the expression "a to b" means "≥a and ≤b".

(A) Polycarbonate Resin

The polycarbonate (PC) resin according to one embodiment of the invention may include any typical polycarbonate resin used in thermoplastic resin compositions. For example, the polycarbonate resin may be an aromatic polycarbonate resin prepared by reacting diphenols (aromatic diol compounds) with a precursor, such as phosgene, halogen formate, or carbonate diester.

Examples of the diphenols may include 4,4'-biphenol, 2,2-bis(4-hydroxyphenyl)-propane, 2,4-bis(4-hydroxyphenyl)-2-methylbutane, 1,1-bis(4-hydroxyphenyl)cyclohexane, 2,2-bis(3-chloro-4-hydroxyphenyl)propane, and 2,2-bis-(3,5-dichloro-4-hydroxyphenyl)propane, without being limited thereto. For example, the diphenols may be 2,2-bis-(4-hydroxyphenyl)propane, 2,2-bis(3,5-dichloro-4-hydroxyphenyl)propane, or 1,1-bis(4-hydroxyphenyl)cyclohexane, specifically 2,2-bis-(4-hydroxyphenyl)propane, which is also referred to as bisphenol A.

In some embodiments, the polycarbonate resin may be a branched polycarbonate resin. For example, the polycarbonate resin may be a polycarbonate resin prepared by adding a tri- or higher polyfunctional compound, specifically, a tri- or higher valent phenol group-containing compound, in an amount of about 0.05 mol % to about 2 mol % based on the total number of moles of the diphenols used in polymerization.

In some embodiments, the polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 50,000 g/mol, for example, about 15,000 g/mol to about 40,000 g/mol, as measured by gel permeation chromatography (GPC). Within this range, the thermoplastic resin composition can have good flowability (processability).

In some embodiments, the polycarbonate resin may have a melt-flow index (MI) of about 5 g/10 min to about 80 g/10 min, as measured at 300° C. under a load of 1.2 kgf in accordance with ISO 1133, without being limited thereto. Alternatively, the polycarbonate resin may be a mixture of at least two polycarbonate resins having different melt flow indexes.

(B) Mica

According to the present invention, the mica serves to improve stiffness of the thermoplastic resin composition without deterioration in impact resistance, and may include mica surface-treated with a silane compound.

In some embodiments, the mica may be plate-shaped or amorphous mica particles and may have an average particle diameter (D50, a diameter at a distribution rate of 50%) of about 60 μm to about 300 μm, for example, about 60 μm to about 200 μm, as measured by a particle analyzer (Manufacturer: Sympatec, Model: Helos). If the mica has an average particle diameter out of this range, the thermoplastic resin composition can have insufficient improvement in stiffness (flexible strength) and can suffer from deterioration in external appearance.

The mica may have an aspect ratio of about 50 to about 150 in a cross-section thereof. Herein, the aspect ratio refers to a ratio of major diameter to minor diameter of the mica in a cross-section of the mica.

In some embodiments, a silane compound is used as a surface treatment agent for the mica and may include, for example, vinyltrichlorosilane, vinyltris(β-methoxyethoxy) silane, vinyltriethoxysilane, vinyltrimethoxysilane, 3-methacryloxypropyl-trimethoxysilane, β-(3,4-epoxycyclohexyl)-ethyltrimethoxysilane, γ-glycidoxypropyl-trimethoxysilane, γ-glycidoxypropyl-methyldiethoxysilane, N-β-(aminoethyl)-γ-aminopropyl-trimethoxysilane, N-β(aminoethyl)-γ-aminopropyl-methyldiethoxysilane, 3-aminopropyl-triethoxysilane, N-phenyl-γ-aminopropyl-trimethoxysilane, γ-mercaptopropyl-trimethoxysilane, and γ-chloropropyl-trimethoxysilane. For example, γ-glycidoxypropyl-trimethoxysilane, γ-glycidoxypropyl-methyldiethoxysilane, and the like may be used. In addition, the mica may be surface-treated with the silane compound by a typical method, for example, screen printing, printing, spin coating, dipping, or ink spraying.

In some embodiments, the mica surface-treated with the silane compound may include about 100 parts by weight of mica and about 0.1 to about 2 parts by weight of the silane compound. Within this range, the thermoplastic resin composition has good properties in terms of stiffness, impact resistance, heat resistance, and the like.

In some embodiments, the mica (B) may be present in an amount of about 20 parts by weight to about 60 parts by weight, for example, about 20 parts by weight to about 55 parts by weight, relative to about 100 parts by weight of the polycarbonate resin (A). If the content of the mica is less than about 20 parts by weight, the thermoplastic resin composition can suffer from deterioration in stiffness and the like, and if the content of the mica exceeds about 60 parts by weight, the thermoplastic resin composition can suffer from deterioration in impact resistance, flowability, and the like.

(C) Modified Polyolefin

The modified polyolefin according to the present invention serves to improve impact resistance and flowability of the thermoplastic resin composition together with the mica, and may have a structure including a polyolefin as a main chain and functional groups (an alkyl carboxylate group, a glycidyl modified ester group, an arylate group, a nitrile group, and the like) grafted to the main chain. For example, a modified polyolefin including a repeat unit represented by Formula 1 and a repeat unit represented by Formula 2 may be used.

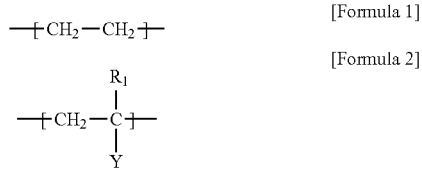

where $R_1$ is a hydrogen atom or a methyl group, Y is —$COOR_2$ ($R_2$ being a $C_1$ to $C_{12}$ alkyl group), a glycidyl modified ester group, an arylate group, or a nitrile group (—CN).

In some embodiments, the modified polyolefin may be prepared by polymerization of olefin and at least one compound selected from among an alkyl (meth)acrylate, an ethylenically unsaturated group-containing modified ester, an ethylenically unsaturated group-containing arylate, and acrylonitrile.

In some embodiment, the modified polyolefin may include about 50 wt % to about 95 wt %, for example, about 70 wt % to about 93 wt %, of the repeat unit represented by Formula 1; and about 5 wt % to about 50 wt %, for example, about 7 wt % to about 30 wt %, of the repeat unit represented by Formula 2. Within this range, the modified polyolefin can secure good impact resistance and compatibility of the thermoplastic resin composition.

In some embodiments, the modified polyolefin may be prepared in the form of a random copolymer, a block copolymer, a multi-block copolymer, or a combination thereof.

In some embodiments, the modified polyolefin may have a melt flow index of about 0.01 g/10 min to about 40 g/10 min, for example, about 0.1 g/10 min to about 10 g/10 min, as measured under conditions of 190° C. and 2.16 kgf in accordance with ASTM D1238.

In some embodiments, the modified polyolefin (C) may be present in an amount of about 0.1 parts by weight to about 20 parts by weight, for example, about 1 part by weight to about 10 parts by weight, relative to about 100 parts by weight of the polycarbonate resin (A). If the content of the modified polyolefin is less than about 0.1 parts by weight, the thermoplastic resin composition can suffer from deterioration in impact resistance and the like, and if the content of the modified polyolefin exceeds about 20 parts by weight, the thermoplastic resin composition can suffer from deterioration in stiffness and the like.

In some embodiments, the mica (B) and the modified polyolefin (C) may be present in a weight ratio (B:C) of about 3:1 to about 40:1, for example, about 4:1 to about 30:1. Within this range, the thermoplastic resin composition can have further improved properties in terms of impact resistance, stiffness, and balance therebetween.

(D) Phosphorus Flame Retardant

The phosphorus flame retardant according to one embodiment of the invention may include any typical phosphorus flame retardant used in typical thermoplastic resin compositions. For example, the phosphorus flame retardant may include a phosphate compound, a phosphonate compound, a phosphinate compound, a phosphine oxide compound, a phosphazene compound, and a metal salt thereof. These compounds may be used alone or as a mixture thereof.

In some embodiments, the phosphorus flame retardant may include an aromatic phosphoric ester compound (phosphate compound) represented by Formula 3:

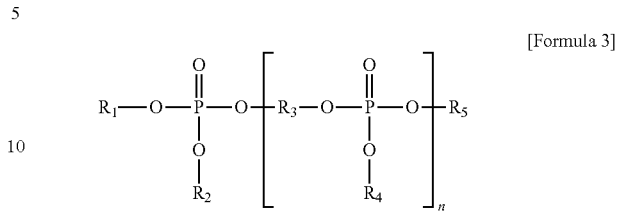

where $R_1$, $R_2$, $R_4$ and $R_5$ are each independently a hydrogen atom, a $C_6$ to $C_{20}$ aryl group, or a $C_1$ to $C_{10}$ alkyl group-substituted $C_6$ to $C_{20}$ aryl group; $R_3$ is a $C_6$ to $C_{20}$ arylene group or a $C_1$ to $C_{10}$ alkyl group-substituted $C_6$ to $C_{20}$ arylene group, for example, derivatives of a dialcohol, such as resorcinol, hydroquinone, bisphenol-A, or bisphenol-S; and n is an integer from 0 to 10, for example, 0 to 4.

When n is 0 in Formula 1, examples of the aromatic phosphoric ester compound may include diaryl phosphate such as diphenyl phosphate, triphenyl phosphate, tricresyl phosphate, trixylenyl phosphate, tri(2,6-dimethylphenyl) phosphate, tri(2,4,6-trimethylphenyl) phosphate, tri(2,4-di-tert-butylphenyl) phosphate, and tri(2,6-dimethylphenyl) phosphate; when n is 1 in Formula 1, examples of the aromatic phosphoric ester compound may include bisphenol-A bis(diphenyl phosphate), resorcinol bis(diphenyl phosphate), resorcinol bis[bis(2,6-dimethylphenyl) phosphate], resorcinol bis[bis(2,4-di-tert-butylphenyl) phosphate], hydroquinone bis[bis(2,6-dimethylphenyl) phosphate], and hydroquinone bis[bis(2,4-di-tert-butylphenyl) phosphate]; and when n is 2 or more in Formula 1, the aromatic phosphoric ester compound may be an oligomer type phosphoric ester compound, without being limited thereto. These compounds may be used alone or as a mixture thereof.

In some embodiments, the phosphorus flame retardant (D) may be present in an amount of about 3 parts by weight to about 20 parts by weight, for example, about 5 parts by weight to about 15 parts by weight, relative to about 100 parts by weight of the polycarbonate resin (A). If the content of the modified polyolefin is less than about 3 parts by weight, the thermoplastic resin composition can suffer from deterioration in flame retardancy and the like, and if the content of the modified polyolefin exceeds about 20 parts by weight, the thermoplastic resin composition can suffer from deterioration in heat resistance and the like.

The thermoplastic resin composition according to one embodiment may further include additives used for typical thermoplastic resin compositions. Examples of the additives may include antioxidants, lubricants, fillers, release agents, nucleating agents, stabilizers, pigments, dyes, and mixtures thereof, without being limited thereto. The additives may be present in an amount of about 0.001 parts by weight to about 40 parts by weight, for example, about 0.1 parts by weight to about 10 parts by weight, relative to about 100 parts by weight of the polycarbonate resin.

The thermoplastic resin composition according to one embodiment of the invention may be prepared in pellet form by mixing the aforementioned components, followed by melt extrusion at about 200° C. to about 280° C., for example, about 220° C. to about 250° C., using a typical twin-screw extruder.

In some embodiments, the thermoplastic resin composition may have a notched Izod impact strength of about 3 kgf·cm/cm to about 30 kgf·cm/cm or more, for example, about 3.2 kgf·cm/cm to about 20 kgf·cm/cm, as measured on a ⅛" thick specimen in accordance with ASTM D256-10e1.

In some embodiments, the thermoplastic resin composition may have a flexural modulus of about 60,000 kgf/cm² to about 90,000 kgf/cm², for example, about 60,000 kgf/cm² to about 85,000 kgf/cm², as measured on a 6.4 mm thick specimen at a rate of 2.8 mm/min in accordance with ASTM D790.

In some embodiments, the thermoplastic resin composition may have a flame retardancy of V0 or higher, as measured on a 1.5 mm thick specimen by a UL-94 vertical test method.

In some embodiments, the thermoplastic resin composition may have a spiral flow length of about 250 mm to about 300 mm, for example, about 265 to about 290 mm, as measured after injection molding in a spiral-shaped 2 mm thick mold under conditions of a molding temperature of 260° C., a mold temperature of 60° C., an injection pressure of 1,500 kgf/cm², and an injection rate of 120 mm/s.

A molded product according to the present invention is formed of the thermoplastic resin composition set forth above. For example, the molded product may be produced by various molding methods, such as injection molding, extrusion molding, vacuum molding, and casting. Such molding methods are well known to those skilled in the art. The molded product has good properties in terms of impact resistance, stiffness, flame retardancy, flowability, and balance therebetween, and thus is useful as an interior/exterior material for electric/electronic products. In particular, the molded product may be used as interior/exterior materials for mobile phones, notebook computers, and the like Mode for Invention Next, the present invention will be described in more detail with reference to some examples. It should be understood that these examples are provided for illustration only and are not to be in any way construed as limiting the present invention.

EXAMPLE

Details of components used in Examples and Comparative Examples are as follows.

(A) Polycarbonate Resin

Bisphenol-A type polycarbonate resin (Manufacturer: Rotte Advanced Materials, Product Name: SC-1190) having a weight average molecular weight (Mw) of 25,000 g/mol was used.

(B) Inorganic Filler (B1) Mica surface-treated with a silane compound (γ-glycidoxypropyl-trimethoxysilane) (Manufacturer: Imerys, Product Name: SUZORITE 150PO) was used.

(B2) Talc (Manufacturer: Imerys Minerals, Product Name: Luzenac ST30) was used.

(B3) Non-surface treated mica (Manufacturer: Imerys, Product Name: SUZORITE 150S) was used.

(C) Impact Modifier (C1) Modified polyolefin (ethylene/alkyl (meth)acrylate copolymer, Manufacturer: DuPont, Product Name: Elvaloy AC1330) was used.

(C2) g-ABS prepared by graft copolymerization of 55 wt % of styrene and acrylonitrile (weight ratio: 75/25) to 45 wt % of polybutadiene rubber (PBR) having an average particle diameter (Z-waverage) of 310 nm was used.

(D) Flame Retardant

Bisphenol-A diphosphate (Manufacturer: Yoke Chemical, Product Name: BDP) was used.

Examples 1 to 5 and Comparative Examples 1 to 7

The aforementioned components were mixed in amounts as listed in Tables 1 and 2 and subjected to extrusion molding at 240° C., thereby preparing a thermoplastic resin composition in pellet form. Extrusion molding was performed using a twin-screw extruder (L/D: 36, Φ: 45 mm). The prepared pellets were dried at 80° C. for 3 hours or more and then subjected to injection molding in a 6 oz. injector (molding temperature: 230° C., mold temperature: 60° C.), thereby preparing a specimen. The prepared specimen was evaluated as to the following properties. Results are shown in Tables 1 and 2.

Property Evaluation (1) Impact resistance: Notched Izod impact strength (unit: kgf·cm/cm) was measured on a ⅛" thick Izod specimen in accordance with ASTM D256-10e1.

(2) Stiffness: Flexural modulus (unit: kgf/cm²) was measured on a 6.4 mm thick specimen at a rate of 2.8 mm/min in accordance with ASTM D790.

(3) Flame retardancy: Flame retardancy was measured using 1.0 mm thick specimens in accordance with the UL 94 vertical test standard.

(4) Flowability: Spiral flow length (unit: mm) was measured on a specimen prepared by injection molding in a spiral-shaped 2 mm thick mold under conditions of a molding temperature of 260° C., a mold temperature of 60° C., an injection pressure of 1,500 kgf/cm², and an injection rate of 120 mm/s.

TABLE 1

|  |  | Example | | | | |
|---|---|---|---|---|---|---|
|  |  | 1 | 2 | 3 | 4 | 5 |
| (A) (parts by weight) |  | 100 | 100 | 100 | 100 | 100 |
| (B) (parts by weight) | (B1) | 40 | 43 | 43 | 35 | 55 |
|  | (B2) | — | — | — | — | — |
|  | (B3) | — | — | — | — | — |
|  | (B4) | — | — | — | — | — |
| (C) (parts by weight) | (C1) | 1 | 5 | 10 | 5 | 5 |
|  | (C2) | — | — | — | — | — |
| (D) (parts by weight) |  | 12 | 12 | 12 | 12 | 12 |
| Notched Izod strength |  | 3.7 | 5.2 | 6.8 | 5.6 | 3.2 |
| Flexural modulus |  | 70,000 | 69,000 | 68,000 | 60,000 | 85,000 |
| Flame retardancy |  | V-0 | V-0 | V-0 | V-0 | V-0 |
| Spiral flow length |  | 265 | 275 | 280 | 282 | 265 |

TABLE 2

|  | Comparative Example | | | | | | |
|---|---|---|---|---|---|---|---|
|  | 1 | 2 | 3 | 4 | 5 | 6 | 7 |
| (A) (parts by weight) | 100 | 100 | 100 | 100 | 100 | 100 | 100 |
| (B) (parts by weight) (B1) | — | — | 43 | 15 | 65 | 43 | 43 |
| (B2) | 43 | — | — | — | — | — | — |
| (B3) | — | 43 | — | — | — | — | — |
| (C) (parts by weight) (C1) | 5 | 5 | — | 5 | 5 | 0.05 | 22 |
| (C2) | — | — | 5 | — | — | — | — |
| (D) (parts by weight) | 12 | 12 | 12 | 12 | 12 | 12 | 12 |
| Notched Izod strength | 2.8 | 2.5 | 2.3 | 5.2 | 2.1 | 2.9 | 13 |
| Flexural modulus | 59000 | 69000 | 68,000 | 30,000 | 97,000 | 68,000 | 49,000 |
| Flame retardancy (1.5 mm) | V-0 | V-0 | V-0 | V-0 | V-0 | V-0 | fail |
| Spiral flow length | 255 | 275 | 265 | 294 | 232 | 255 | 285 |

From the results, it could be seen that the thermoplastic resin compositions according to the present invention had good properties in terms of impact resistance, stiffness, flame retardancy, flowability, and the like.

On the contrary, it could be seen that the thermoplastic resin composition of Comparative Example 1 using talc (B2) instead of the surface-treated mica (B1) of the present invention suffered from deterioration in impact resistance and stiffness, and that the thermoplastic resin composition of Comparative Example 2 using the non-surface treated mica (B3) instead of the surface-treated mica (B1) of the present invention suffered from deterioration in stiffness. It could be seen that the thermoplastic resin composition of Comparative Example 3 using g-ABS (C2) instead of the modified polyolefin (C1) of the present invention suffered from deterioration in impact resistance. It could be seen that the thermoplastic resin composition of Comparative Example 4 prepared using an insufficient amount of the surface-treated mica (B1) suffered from deterioration in stiffness, and that the thermoplastic resin composition of Comparative Example 5 prepared using an excess of the surface-treated mica (B1) suffered from deterioration in impact resistance, flowability, and the like. It could be seen that the thermoplastic resin composition of Comparative Example 6 prepared using an insufficient amount of the modified polyolefin (C1) suffered from deterioration in impact resistance, and that the thermoplastic resin composition of Comparative Example 7 prepared using an excess of the modified polyolefin (C1) suffered from deterioration in stiffness and flame retardancy.

It should be understood that various modifications, changes, alterations, and equivalent embodiments can be made by those skilled in the art without departing from the spirit and scope of the present invention.

The invention claimed is:

1. A thermoplastic resin composition comprising:
about 100 parts by weight of a polycarbonate resin;
about 20 parts by weight to about 60 parts by weight of mica surface-treated with a silane compound;
about 0.1 parts by weight to about 20 parts by weight of a modified polyolefin comprising a repeat unit represented by Formula 1 and a repeat unit represented by Formula 2; and
about 3 parts by weight to about 20 parts by weight of a phosphorus flame retardant:

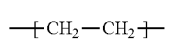

[Formula 1]

$$-\!\!-\!\!(CH_2-CH_2)\!\!-\!\!-$$

-continued

[Formula 2]

$$-\!\!-\!\!\left(CH_2-\underset{Y}{\overset{R_1}{\underset{|}{C}}}\right)\!\!-\!\!-$$

where $R_1$ is a hydrogen atom or a methyl group and Y is —$COOR_2$, a glycidyl modified ester group, an arylate group, or a nitrile group (—CN), wherein $R_2$ is a $C_1$ to $C_{12}$ alkyl group, wherein the mica has an average particle diameter of about 60 μm to about 300 μm and an aspect ratio of about 50 to about 150 in a cross-section thereof.

2. The thermoplastic resin composition according to claim 1, wherein the modified polyolefin comprises about 50 wt % to about 95 wt % of the repeat unit represented by Formula 1 and about 5 wt % to about 50 wt % of the repeat unit represented by Formula 2.

3. The thermoplastic resin composition according to claim 1, wherein the phosphorus flame retardant comprises a phosphate compound, a phosphonate compound, a phosphinate compound, a phosphine oxide compound, and/or a phosphazene compound.

4. The thermoplastic resin composition according to claim 1, wherein the mica and the modified polyolefin are present in a weight ratio of about 3:1 to about 40:1.

5. The thermoplastic resin composition according to claim 1, wherein the thermoplastic resin composition has a notched Izod impact strength of about 3 kgf cm/cm to about 30 kgf cm/cm, as measured on a ⅛" thick specimen in accordance with ASTM D256-10e1.

6. The thermoplastic resin composition according to claim 1, wherein the thermoplastic resin composition has a flexural modulus of about 60,000 kgf/cm² to about 90,000 kgf/cm², as measured on a 6.4 mm thick specimen at a rate of 2.8 mm/min in accordance with ASTM D790.

7. The thermoplastic resin composition according to claim 1, wherein the thermoplastic resin composition has a flame retardancy of V-0 or higher, as measured on a 1.5 mm thick specimen by a UL-94 vertical test method.

8. The thermoplastic resin composition according to claim 1, wherein the thermoplastic resin composition has a spiral flow length of about 250 mm to about 300 mm, as measured after injection molding in a spiral-shaped 2 mm thick mold under conditions of a molding temperature of 260° C., a mold temperature of 60° C., an injection pressure of 1,500 kgf/cm², and an injection rate of 120 mm/s.

9. A molded product formed of the thermoplastic resin composition according to claim 1.

* * * * *